United States Patent
Vitale et al.

(10) Patent No.: US 7,351,265 B2
(45) Date of Patent: Apr. 1, 2008

(54) HYBRID DRIVE ASSEMBLY FOR A VEHICLE, IN PARTICULAR A SCOOTER

(75) Inventors: Emilio Vitale, Arena Metato (IT); Francesco Frendo, Pisa (IT); Luigi Arnone, Naples (IT); Maurizio Marcacci, Leghorn (IT); Giovanni Riggio, Paola (IT)

(73) Assignees: Universita'di Pisa, Pisa (IT); Piaggio&C. S.p.A., Pontedera (IT)

( * ) Notice: Subject to any disclaimer, the term of this patent is extended or adjusted under 35 U.S.C. 154(b) by 206 days.

(21) Appl. No.: 10/538,317

(22) PCT Filed: Dec. 16, 2003

(86) PCT No.: PCT/EP03/51022

§ 371 (c)(1),
(2), (4) Date: Nov. 1, 2005

(87) PCT Pub. No.: WO2004/054836

PCT Pub. Date: Jul. 1, 2004

(65) Prior Publication Data

US 2006/0063638 A1 Mar. 23, 2006

(30) Foreign Application Priority Data

Dec. 16, 2002 (IT) .......................... TO2002A1088

(51) Int. Cl.
*B60K 1/00* (2006.01)
(52) U.S. Cl. .................................... 903/903; 180/65.4
(58) Field of Classification Search .................... 475/4, 475/5, 8, 149; 180/65.1–65.4; 903/903–906

See application file for complete search history.

(56) References Cited

U.S. PATENT DOCUMENTS 5,193,634 A * 3/1993 Masut ....................... 180/65.2

(Continued)

FOREIGN PATENT DOCUMENTS

DE 100 06 743 10/2000

(Continued)

OTHER PUBLICATIONS

English language abstract only included with foreign patent.

*Primary Examiner*—Tisha Lewis
(74) *Attorney, Agent, or Firm*—Hedman & Costigan, p.c.

(57) ABSTRACT

A hybrid drive assembly (1) for a vehicle having at least one drive wheel (2), the drive assembly including an internal combustion engine (3); a transmission unit (5) interposed between a drive shaft (4) of the internal combustion engine (3) and a propeller shaft (6) connected angularly to the drive wheel (2), and in turn including a continuously variable transmission (7) having a drive pulley (10) connected angularly to the drive shaft (4) and a driven pulley (11), and a centrifugal clutch (8) having a hub (20) connected to the driven pulley, and a driven bell (26) connected to the propeller shaft (6); and an electric machine (32) having a rotor (35) integral with the bell (26) of the centrifugal clutch (8). The drive assembly (1) is controlled by a control unit (38), in response to a number of input signals (Ss, Sa, Sf), in a number of operating modes including an all-combustion propulsion mode, an all-electric propulsion mode, a first hybrid propulsion mode wherein the internal combustion engine (3) and the electric machine (32) are connected in series, and a second hybrid propulsion mode wherein the internal combustion engine (3) and the electric machine (32) are connected in parallel.

12 Claims, 2 Drawing Sheets

U.S. PATENT DOCUMENTS

| | | | |
|---|---|---|---|
| 5,841,201 A | 11/1998 | Tabata et al. | 290/40 C |
| 6,109,127 A * | 8/2000 | Liau | 74/336 B |
| 6,155,366 A | 12/2000 | Lin | 180/65.2 |
| 6,344,008 B1 | 2/2002 | Nagano et al. | 475/1 |
| 6,591,934 B2 * | 7/2003 | Tsutsumikoshi | 180/291 |
| 6,659,910 B2 * | 12/2003 | Gu et al. | 477/6 |
| 7,004,296 B2 * | 2/2006 | Heiartz et al. | 192/3.51 |

FOREIGN PATENT DOCUMENTS

| | | |
|---|---|---|
| DE | 100 36 966 | 4/2001 |
| EP | 0 445 873 | 9/1991 |
| EP | 0 908 343 | 4/1999 |

\* cited by examiner

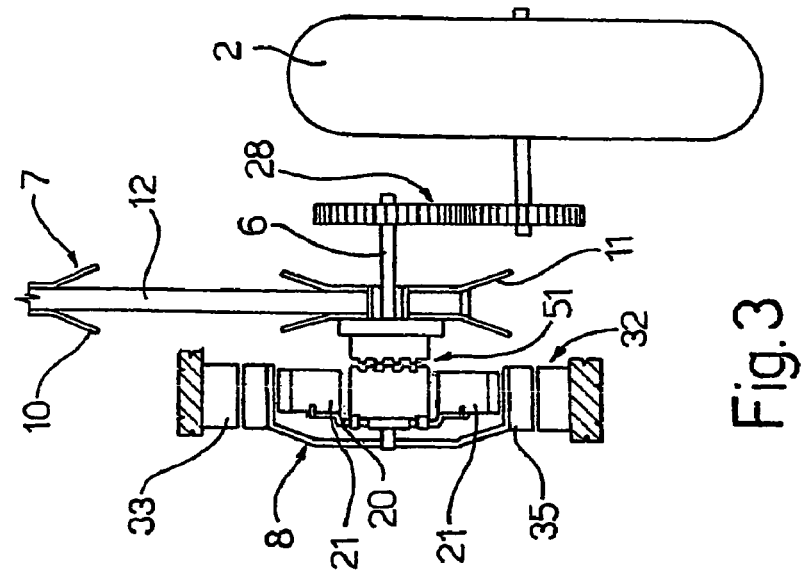
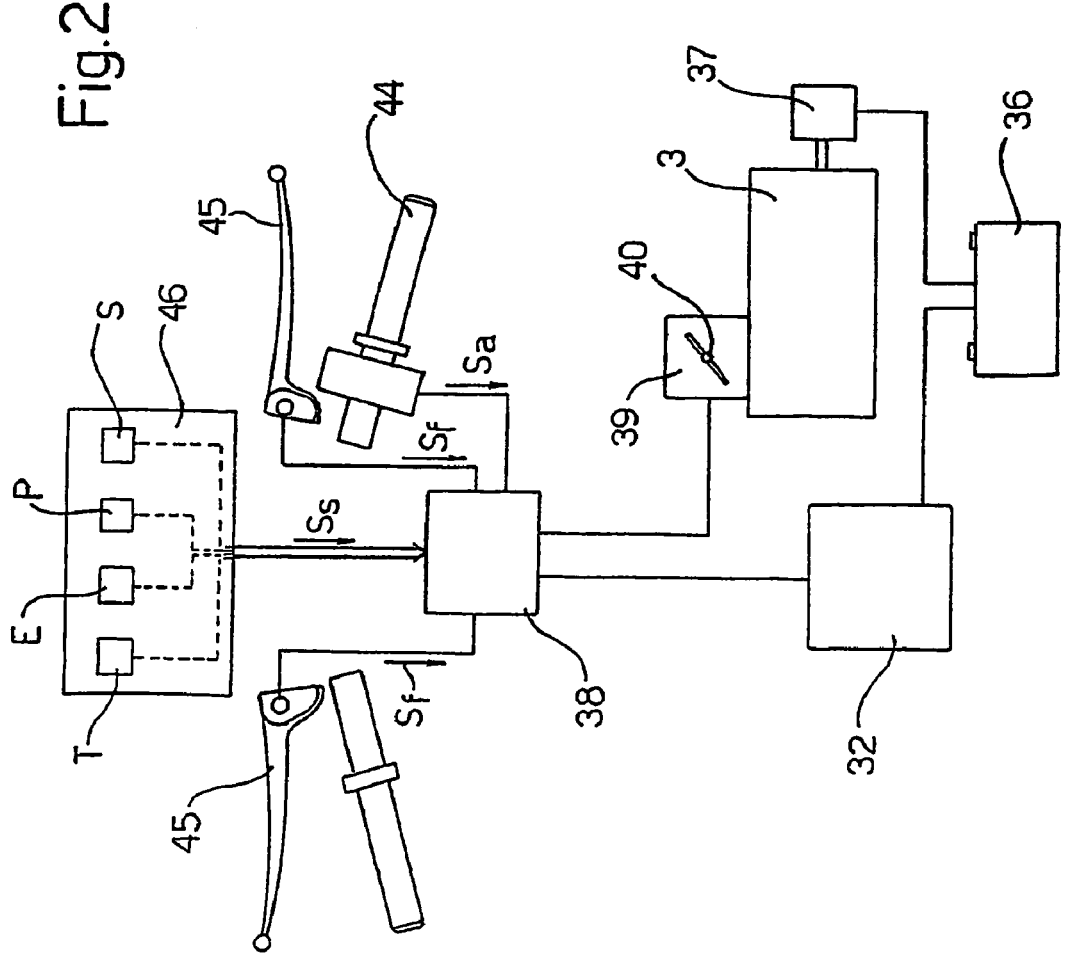

HYBRID DRIVE ASSEMBLY FOR A VEHICLE, IN PARTICULAR A SCOOTER

TECHNICAL FIELD

The present invention relates to a hybrid drive assembly for a road vehicle, in particular a scooter.

BACKGROUND ART

As is known, numerous road vehicle, in particular car, manufacturers are currently experimenting hybrid-propulsion vehicles, some of which have recently been marketed. Though "hybrid propulsion" normally refers to the use of two or more different propulsion systems, the solutions hitherto proposed are normally a combination of an internal combustion engine (hereinafter referred to simply as a "combustion engine") and an electric motor, to exploit the advantages and compensate the disadvantages of each.

More specifically, the main advantage of a combustion engine, and the reason why it is used almost exclusively in road vehicles, is the fuel distance obtainable by virtue of the high energy concentration of the fuel employed (substantially hydrocarbons). On the other hand, a combustion engine produces harmful emissions, can only operate within a given speed range, thus requiring the use of auxiliary components (gearbox and clutch), and has a relatively high noise level.

Moreover, even within the operating range, the efficiency of a combustion engine is fairly low (about 20-30%), and variations in the steady-state operation of the engine considerably increase pollutant emissions.

An electric motor produces no "local" pollution, is quiet, highly efficient (about 80%), and capable of generating torque as of start-up. Application in road vehicles, however, has so far been impaired by the limited range of the electric batteries currently available, at least those of a size, weight and cost feasible for earth vehicles.

To eliminate or reduce the drawbacks associated with the use of one type of engine/motor, hybrid solutions of various configurations have been proposed enabling alternative or combined use of both propulsion systems.

More specifically, in a first known so-called "series hybrid" combination, the combustion engine serves solely to drive an electric current generator, which charges the batteries powering the electric motor: propulsion is therefore governed exclusively by the electric motor. This solution provides for a considerable reduction in consumption, by the combustion engine only being called upon to supply average power, and so being operating in optimum steady conditions.

In the "parallel hybrid" configuration, both the combustion engine and the electric motor are connected to the drive wheels by appropriate transmission mechanisms.

Known hybrid drive assemblies of the type briefly described above are complex, expensive, and bulky, which is why, to the Applicant's knowledge, they have never been marketed for compact, low-cost vehicles, such as scooters.

EP-A-0 908 343 discloses a hybrid drive assembly including an internal combustion engine having a drive shaft, an electric machine having a rotor connected to a primary shaft aligned to the engine drive shaft, a clutch interposed between the engine drive shaft and the electric machine rotor, and a transmission unit including a CVT interposed between the primary shaft and the wheel axle.

Besides being considerably complex and thus not adapted for use in small road vehicles such as scooters, the above-referenced known hybrid drive assembly has a drawback in that the electric machine is located upstream from the transmission unit, and in particular the CVT, so that, when the electric machines operates as a generator (regenerative brake), energy recovery efficiency is reduced.

DISCLOSURE OF INVENTION

It is an object of the present invention to provide an extremely straightforward, low-cost, compact hybrid drive assembly, which can also be used in small, low-cost road vehicles, such as scooters, but which also permits selection of a number of operating modes on the basis of different operating requirements or road conditions.

According to the present invention, there is provided a hybrid drive assembly for a vehicle having at least one drive wheel, the drive assembly comprising an internal combustion engine; and a transmission unit interposed between a drive shaft of the internal combustion engine and a propeller shaft connected angularly to the drive wheel, and in turn comprising a clutch and a transmission having a drive element connected angularly to the drive shaft of the internal combustion engine and a driven element connectable to said propeller shaft; the drive assembly further including an electric machine which can be operated instead of or in combination with said internal combustion engine, characterised in that said clutch is interposed between said driven element of said transmission and said propeller shaft, and has a drive member connectable to said driven element of said transmission and a driven member connected to the propeller shaft, said electric machine comprising a rotor connected angularly and permanently to said driven member of said clutch.

The present invention also relates to a vehicle, in particular a scooter, comprising such a hybrid drive assembly.

BRIEF DESCRIPTION OF THE DRAWINGS

Two preferred, non-limiting embodiments of the present invention will be described by way of example with reference to the accompanying drawings, in which:

FIG. 2 shows a diagram of a control system for controlling the FIG. 1 drive assembly;

FIG. 3 shows a partial diagram of an alternative embodiment of the present invention.

BEST MODE FOR CARRYING OUT THE INVENTION

Figure 1:
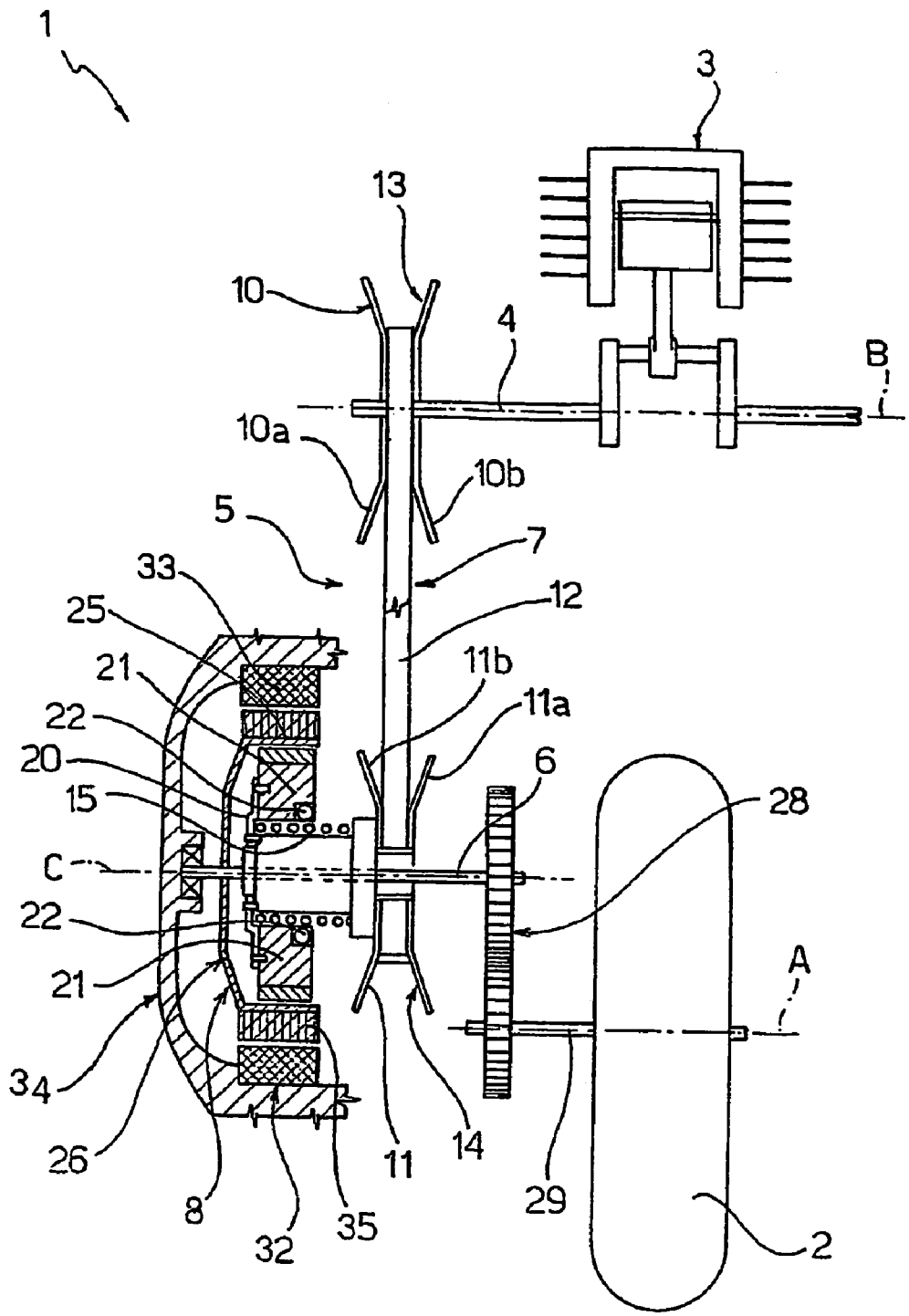
FIG. 1 shows a diagram of a hybrid drive assembly in accordance with a first embodiment of the invention.

Number 1 in FIG. 1 indicates as a whole a hybrid drive assembly for a scooter having a rear drive wheel 2 of axis A.

Drive assembly 1 comprises a combustion engine 3 having a drive shaft 4 of axis B parallel to axis A; and a transmission unit 5 interposed between drive shaft 4 and a propeller shaft 6 of axis C, parallel to axes A and B, and connected angularly to the drive wheel 2.

More specifically, transmission unit 5 comprises a continuously variable transmission or CVT 7 (hereinafter referred to simply as "CVT 7"), and a centrifugal clutch 8 in series with each other.

CVT 7 comprises a drive pulley 10 fitted to drive shaft 4; a driven pulley 11 coaxial with and fitted in angularly free manner to propeller shaft 6; and a V belt 12 looped about pulleys 10, 11. Pulleys 10, 11 have respective V grooves 13, 14 for belt 12, and are defined by two half-pulleys 10*a*, 10*b* and 11*a*, 11*b* respectively, which are movable axially with respect to each other to vary the width of groove 13, 14 and therefore the winding diameter of belt 12.

Variation of the relative axial position of half-pulleys 10a, 10b of drive pulley 10 is controlled by a known centrifugal device not shown; and half-pulleys 11a, 11b of driven pulley 11 are loaded axially towards each other by a spring 15 to automatically adapt the winding diameter of belt 12 inversely to that of drive pulley 10.

More specifically, driven pulley 11 is connectable selectively to propeller shaft 6 by centrifugal clutch 8, which comprises a hub 20 fitted for rotation to driven pulley 11; a number of centrifugal weights 21 carried by hub 20 and maintained in a radially withdrawn rest position by springs 22; and a driven bell 26 integral with propeller shaft 6.

In response to rotation of hub 20 at an angular speed sufficient to overcome the reaction of springs 22, centrifugal weights 21 move radially outwards to cooperate frictionally with a substantially cylindrical lateral wall 25 of bell 26.

Spring 15 of driven pulley 11 is compressed axially between hub 20 of centrifugal clutch 8 and the movable half-pulley 11b, so as to load half-pulley 11b axially towards the fixed half-pulley 11a.

Propeller shaft 6 is connected to drive wheel 2 by a conventional reduction gear 28 shown only schematically in FIG. 1 and having propeller shaft 6 as the input member, and, as the output member, a shaft 29 of axis A, to which drive wheel 2 is fixed rigidly in use.

According to the present invention, drive assembly 1 also comprises an electric machine 32 coaxial with centrifugal clutch 8 and having a stator 33 housed in a fixed casing 34 of drive assembly 1, and a rotor 35 outwardly coaxial with lateral wall 25 of bell 26 of centrifugal clutch 8, and integral with bell 26 and therefore with propeller shaft 6.

Electric machine 32 is conveniently a reversible type, and is connected to the vehicle battery 36 (FIG. 2) for use as a generator to charge the battery in given operating conditions. Drive assembly 1 also comprises an electric generator 37 driven by combustion engine 3 in known manner and connected to battery 36.

Drive assembly 1 is controlled by a control unit 38 which controls electric machine 32, and an actuator 39 for adjusting the position of a butterfly valve 40 of combustion engine 3, in response to a number of input signals indicating the operating conditions of assembly 1, and which comprise a signal Sa indicating the position of an accelerator grip 44, and signals Sf indicating user action on the brake levers 45.

Control unit 38 also receives input signals Ss from a selector device 46 located on the instrument panel of the vehicle and for selecting the operating mode of drive assembly 1. The selector device may comprise, for example, a number of buttons T, E, P, S for respectively selecting the following operating modes:

"combustion" (T), in which propulsion is provided solely by combustion engine 3;

"electric" (E), in which propulsion is provided solely by electric machine 32 operating as an electric motor;

"parallel hybrid" (P), in which combustion engine 3 and electric machine 32 both provide drive power; and "series hybrid" (S), in which combustion engine 3 is used solely to power electric generator 37 to charge battery 36, while torque to the drive wheel is provided solely by electric machine 32.

Operation of drive assembly 1 will now be described with reference to the above operating modes.

In "combustion" mode, electric machine 32 is not powered, so that, disregarding the slight increase in the moment of inertia of bell 26 of centrifugal clutch 8, drive assembly 1 functions in exactly the same way as a conventional, all-mechanical assembly, as though electric machine 32 did not exist. More specifically, at idling speed of combustion engine 3, CVT 7 maintains a "short" ratio defined by the minimum winding diameter of belt 12 on drive pulley 10, and by the maximum winding diameter of belt 12 on driven pulley 11. In this condition, centrifugal clutch 8 is open, so that propeller shaft 6 is disconnected from CVT 7 and transmits no torque to drive wheel 2.

As the rotation speed of drive shaft 4 increases, centrifugal clutch 8 is closed by the movement of centrifugal weights 21, which rotationally connect bell 26, and therefore propeller shaft 6, to driven pulley 11 of CVT 7, so that the vehicle is started with a "short" transmission ratio.

As the speed of drive shaft 4 increases further, CVT 7 switches, gradually and automatically in known manner not described in detail, from said "short" ratio to a "long" ratio defined by the maximum winding diameter of belt 12 on drive pulley 10, and by the minimum winding diameter of belt 12 on driven pulley 11.

When decelerating or braking, the above operating steps are repeated in reverse. Moreover, rotor 35 of electric machine 32, being integral with bell 26 of the centrifugal clutch, is driven by drive wheel 2, so that electric machine 32 acts as an electric current generator which draws mechanical power (and so acts as an electrodynamic brake) and generates electrical power.

In "electric" mode, combustion engine 3 is not operated, so that drive shaft 4 and CVT 7 are stationary, and centrifugal clutch 8 is open, by centrifugal weights 21 being subjected solely to the return force exerted by springs 22. Everything upstream from bell 26, including combustion engine 3 and CVT 7, is therefore completely disconnected from drive wheel 2.

The drive torque of electric machine 32, whose rotor 35 is integral with bell 26, is transmitted by the bell directly to propeller shaft 6 and via reduction gear 28 to drive wheel 2.

In this operating mode too, when decelerating or braking, with no power being generated by electric machine 32, rotor 35 is driven and electric machine 32 draws mechanical power and generates electrical power to charge battery 36.

In "parallel hybrid" mode, combustion engine 3 and electric machine 32, the latter operating as a motor as described in "electric" mode, operate simultaneously; and the torque and power produced by both come together and are added at propeller shaft 6, thus greatly improving performance. Moreover, user power demand can be divided between combustion engine 3 and electric machine 32 to reduce consumption and/or emissions.

In "series hybrid" mode, combustion engine 3 serves solely to drive electric generator 37, and propulsion is provided solely by electric machine 32. With the architecture of assembly 1 shown in FIG. 1, for combustion engine 3 to be disconnected from drive wheel 2, engine speed must be low enough not to close centrifugal clutch 8. In the event this imposes a less than optimum operating condition of combustion engine 3 in terms of efficiency and emissions, the architecture of assembly 1 is appropriately modified as shown in FIG. 3, in which driven pulley 11 and hub 20 of the centrifugal clutch, as opposed to being connected permanently, are connectable selectively by a coupling 51, e.g. an electromagnetic so-called "Gravina coupling" controlled by unit 38.

With this transmission arrangement, when "series hybrid" mode is selected, coupling 51 is set to the "open" position, so that combustion engine 3 can operate at constant speed selected to optimize efficiency and minimize emissions, regardless of the intervention threshold speed of centrifugal clutch 8. Control unit 38 may conveniently be programmed to operate combustion engine 3 at two or more different power levels (but always at constant speed at each power level) depending on the mean power required by the user and/or road conditions.

Moreover, coupling 51 permits switching from one operating mode to another without stopping the vehicle.

When braking or decelerating in hybrid modes too, electric machine 32 acts as a generator, as opposed to a motor, and therefore as a regenerative brake.

The advantages of drive assembly 1 according to the present invention will be clear from the foregoing description.

In particular, the transmission architecture provides for obtaining an extremely straightforward, low-cost, compact hybrid drive assembly that can also be used in small, low-cost road vehicles such as scooters, and which can operate in a number of modes selectable on the basis of different operating requirements and road conditions.

Moreover, the various operating modes permit energy saving, by virtue of electric machine 32 operating as a regenerative brake.

Finally, the transmission architecture provides for optimum global efficiency in each operating mode, by limiting undesired interaction between the two propulsion systems when operated individually, and by synergistically exploiting the potential of both in hybrid operating modes. In fact, in "combustion" mode, assembly 1 operates as though electric machine 32 did not exist; in "electric" mode, combustion engine 3 and CVT 7 are disconnected from drive wheel 2 and in no way impair efficiency; in "parallel hybrid" mode, the total power of both propulsion systems can be exploited, and power demand divided between the two propulsion systems to reduce consumption and/or emissions; and, in "series hybrid" mode, considerable energy saving is achieved by operating combustion engine 3 in optimum steady conditions in terms of efficiency.

Clearly, changes may be made to, and to control of, drive assembly 1 as described herein without, however, departing from the scope of the accompanying claims.

In particular, CVT 7 may be replaced by a different type of transmission, e.g. a synchronous belt transmission; centrifugal clutch 8 may be replaced by a controlled clutch; and electric machine 32 may be located differently, providing rotor 35 is permanently connected downstream from clutch 8, i.e. connected permanently to drive wheel 2.

One or more "automatic" control modes may be provided, in which the control unit, as opposed to activating the above control modes ("combustion", "electric", "parallel hybrid" and "series hybrid") as selected by the user, may switch automatically from one to another on the basis of programmed control logic, e.g. to optimize performance, minimize consumption or emissions, or in particular operating conditions. For example, an automatic switch may be made from "electric" to "combustion" or "series hybrid" mode, in the event the charge of battery 36 falls below a predetermined threshold value.

The invention claimed is:

1. A hybrid drive assembly for a vehicle having at least one drive wheel, the drive assembly comprising an internal combustion engine; and a transmission unit interposed between a drive shaft of the internal combustion engine and a propeller shaft connected angularly to the drive wheel, and in turn comprising a clutch and a transmission, having a drive element connected angularly to the drive shaft of the internal combustion engine and a driven pulley connectable to said propeller shaft; the drive assembly further including an electric machine which can be operated instead of or in combination with said internal combustion engine, characterized in that said clutch is interposed between said driven pulley of said transmission and said propeller shaft, and has a drive member connectable to said driven pulley of said transmission and a driven member connected to the propeller shaft, said electric machine comprising a rotor connected angularly and permanently to said driven member of said clutch and having a coupling interposed between said driven pulley and said drive member of said clutch.

2. A drive assembly as claimed in claim 1, characterized in that said transmission is a CVT, said drive element consists of a drive pulley.

3. A drive assembly as claimed in claim 1, characterized in that said clutch is a centrifugal clutch; said driven member of said clutch being a bell integral with said propeller shaft.

4. A drive assembly as claimed in claim 3, characterized in that said rotor of said electric machine is coaxial and integral with said bell of said clutch.

5. A drive assembly as claimed in claim 1, characterized in that said electric machine is reversible.

6. A drive assembly as claimed in claim 1, characterized by comprising an electric generator driven by said internal combustion engine.

7. A drive assembly as claimed in claim 1, characterized by comprising a control unit for controlling said internal combustion engine and said electric machine, in response to a number of input signals (Se, Sf, Ss), in a number of operating modes comprising at least a combustion mode wherein only the internal combustion engine is activated, an electric mode wherein said electric machine operates as a motor and said internal combustion engine is disabled, a parallel hybrid mode wherein said internal combustion engine and said electric machine are both activated and connected to said drive wheel, and a series hybrid mode wherein said internal combustion engine is disconnected from said drive wheel and drives said electric generator.

8. A drive assembly as claimed in claim 7, characterized by comprising selecting means for selecting said operating modes of said drive assembly; said input signals (Sa, Sf, Ss) comprising at least a number of input signals (Ss) generated by said selecting means.

9. A drive assembly as claimed in claim 7, characterized in that said input signals (Sa, Sf, Ss) comprise a signal (Sa) indicating the position of an accelerator member.

10. A drive assembly as claimed in claim 7, characterized in that said input signals (Sn, Sf, Ss) comprise a signal indicating actions on a brake control member of the vehicle.

11. A vehicle having at least one drive wheel, characterized by comprising a hybrid drive assembly as claimed in claim 1.

12. A vehicle as claimed in claim 11, characterized by being a scooter.

* * * * *